United States Patent Office 3,137,660
Patented June 16, 1964

3,137,660
PROCESS FOR PREPARING ANHYDRIDE POLYMERS AND RESULTING PRODUCT
John F. Jones, Cuyahoga Falls, Ohio, assignor to The B. F. Goodrich Company, New York, N.Y., a corporation of New York
No Drawing. Filed Dec. 27, 1955, Ser. No. 555,308
40 Claims. (Cl. 260—2.2)

This invention relates to substantially linear and to cross-linked polymers having a series of recurring anhydride linkages attached to the main polymer chain and to methods of preparing the polymers and more particularly refers to a polymer having a plurality of recurring

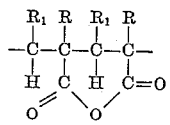

linkages, which may be referred to as alpha-methylene glutaric anhydride groups, and to a method of preparing the polymers from alpha-beta-unsaturated monocarboxylic acids or a mixture containing such acids and one or more monomers which are copolymerizable therewith by using a dehydrating agent during the polymerization step or by treating a linear or cross-linked polymer or copolymer of an alpha-beta-unsaturated monocarboxylic acid with a dehydrating agent to yield the anhydride form of the polymers. In the above formula R represents hydrogen, a halogen selected from the class consisting of hydrogen, chlorine, bromine and fluorine, a —CN group, an alkyl group having from 1 to 10 carbon atoms, an aryl group, an aralkyl or an alkaryl group and $R_1$ represents hydrogen and a halogen selected from the class consisting of chlorine, bromine and fluorine.

Prior to my invention neither linear nor cross-linked polymers having a plurality of alpha-methylene glutaric anhydride groups attached to or constituting an integral part of the main polymer chain could be prepared from alpha-beta-monocarboxylic acids or polymers thereof. Maleic anhydride and other alpha-beta-unsaturated polybasic acids do not homopolymerize to form polymers in which substantially all carboxyl groups are converted to anhydride linkages, but they will copolymerize to form copolymers having alternating or random succinic anhydride groups and carboxyl groups along the main polymer chain.

Alpha-beta-unsaturated monocarboxylic acid anhydrides can be reacted under certain conditions to form non-linear polymers, but copolymers of alpha-beta-unsaturated monocarboxylic acid anhydrides with other unsaturated monomers form highly cross-linked hard resins which are substantially infusible and difficultly soluble, as described in U.S. Patent 2,321,728.

The linear, non-cross-linked polymers of my invention by contrast, are permanently fusible and readily dissolved in many solvents, and are hydrophilic in that they will dissolve slowly in water with rupture of the anhydride groups. To prepare cross-linked polymers which do not undergo chain scission on opening of the anhydride linkages, it is essential that a polyunsaturated cross-linking agent of the type hereinafter described be employed. The degree of cross-linking can be regulated so as to control to some degree the hydrophilic properties of the polymers.

An object of this invention is the provision of substantially linear polymers having a plurality of recurring

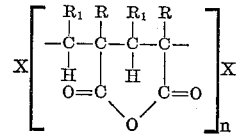

groups along the main polymer chain. In the formula $n$ represents an integer greater than 1 and X represents terminal group such as hydrogen and it also represents the remainder of the polymer chain.

Another object is the provision of substantially linear polymers of alph-abeta-unsaturated monocarboxylic acids and copolymers thereof having from about 10% to substantially all of the carboxyl groups in the form of anhydride linkages.

Another object is the provision of substantially linear polymers formed by "head to toe" polymerization of an alpha-beta-unsaturated monocarboxylic acid wherein the carboxyl groups are dehydrated to anhydride groups.

Another object is a method of preparing substantially linear polymers having recurring

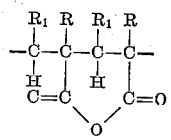

groups by polymerizing alpha-beta-unsaturated monocarboxylic acids in the presence of a dehydrating agent.

Another object is the provision of polymers having recurring alpha-methylene glutaric anhydride linkages along the main polymer chain which chain is cross-linked with a compound having a plurality of polymerizable unsaturated linkages other than anhydride groups.

Still another object is the provision of a method of preparing anhydride containing polymers, as defined above, by carrying out the reaction in the presence of an acid anhydride under substantially anhydrous conditions.

Yet another object is the provision of a method for forming a plurality of glutaric anhydride groups on a polymer of an alpha-beta-unsaturated monocarboxylic acid by treating the polymer with a dehydrating agent.

The above objects are accomplished by (1) polymerizing a substantially anhydrous or glacial alpha-beta-unsaturated monocarboxylic acid and substituted derivatives thereof in the presence of a polymerization catalyst and in the presence of a dehydrating agent which does not copolymerize with the alpha-beta-unsaturated monocarboxylic acid and removing the water of dehydration either by azeotropic distillation and/or by chemically combining it with the dehydrating agent or (2) by first polymerizing or copolymerizing the alpha-beta-unsaturated monocarboxylic acid and thereafter treating the polymer with a dehydrating agent.

The recurring alpha-methylene glutaric anhydride groups of the polymer can have other substituents, depending on the monomer or mixture of monomers used in preparing the polymer.

The monocarboxylic, alpha-beta-unsaturated acids that can be used in preparing the polymer have the general structure

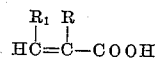

in which R and $R_1$ each has the same designation as that given above.

Specific compounds which come under this designation include acrylic acid, methacrylic acid, alpha-ethyl, propyl, butyl, amyl, hexyl, heptyl, octyl, nonyl and decyl acrylic acids, alpha-chloro, bromo and fluoro acrylic acid, alpha-phenyl acrylic acid, alpha-cyano acrylic acid, alpha-benzyl acrylic acid, alpha-tolyl acrylic acid, and other alpha-substituted acrylic acids with hydrocarbon substituents having up to about 10 carbon atoms. The preferred monomers are acrylic acid, methacrylic acid, alpha-chloro acrylic acid and alpha-cyano acrylic acid. The most preferred monomers are acrylic and methacrylic acids because of their ready availability, ease of polymerization, and inertness of the main polymer chain. The monomers can be homopolymerized in which case each R and $R_1$ of the generic formula will be alike or they can be copolymerized in any proportion in which case each R and $R_1$ of the polymer may be different.

Substantially linear interpolymers of the described alpha-beta-unsaturated carboxylic acids and other unsaturated compounds can also be prepared. In preparing these interpolymers at least one molar equivalent or more of an acrylic acid, based on the comonomer should be used. The comonomers that can be employed include maleic anhydride, monochloro maleic anhydride, dichloro maleic anhydride, beta-ethyl, propyl, butyl, amyl, hexyl, octyl, nonyl, and decyl acrylic acids, beta-chloro, bromo and fluoro acrylic and methacrylic acids, crotonic acid, angelic acid, tiglic acid, beta-cyano acrylic and methacrylic acids, beta-phenyl acrylic acid (cinnamic acid), beta-benzyl acrylic acid, beta-tolyl acrylic acid, 2,3-diethyl acrylic acid, 2,3-dipropyl acrylic acid and other beta- or alpha-beta-substituted acrylic acids with hydrocarbon substituents having up to about 10 carbon atoms, vinyl alkyl ethers, vinyl esters and other unsaturated monomers which will copolymerize with acrylic acid, alpha-substituted derivatives thereof and beta-halo acrylic acids.

In place of the monomers mentioned above, homopolymers and interpolymers derived therefrom can be treated with a dehydrating agent to form a plurality of anhydride linkages along the main polymer chain.

The dehydrating acid anhydrides that can be employed include those of saturated and unsaturated mono- and polybasic carboxylic acids, if they do not react with the monomeric polymerizable compounds. These include anhydrides of saturated, monobasic aliphatic acids such as acetic anhydride, propionic anhydride, butyric anhydride, pentanoic anhydride, hexanoic anhydride and higher monocarboxylic saturated aliphatic acid anhydrides. Anhydrides of chlorinated, brominated and fluorinated acids can also be used.

Anhydrides of saturated polycarboxylic aliphatic acids that can be used include succinic anhydride, glutaric anhydride, adipic, pimelic, suberic, azelaic, sebacic and anhydrides of higher molecular weight dicarboxylic acids which do not normally form internal anhydrides, but act more nearly like anhydrides of mono-carboxylic acids. These anhydrides can also be used as dehydrating agents to produce the polymers of this invention.

In addition to aliphatic anhydrides, the anhydrides of mono- and polycarboxylic aromatic and cyclo aliphatic acids can be employed in the preparation of the polymers of this invention. These anhydrides include benzoic anhydride and anhydrides of homologues and ring substituted benzoic anhydride, such as the chloro or bromo benzoic anhydrides, the nitro benzoic anhydrides, the toluic or xylylic anhydrides, or nitro or halogen derivatives thereof. Anhydrides of polybasic aromatic acids include phathalic anhydride, the anhydride of biphenyl o-o′-dicarboxylic acid, pyromellitic anhydride and others.

Cyclo aliphatic anhydrides, that will cause anhydride groups to form along the polymer chain include tetrahydro and hexahydro phthalic anhydrides and hydrocarbon or halogen substituted derivatives thereof.

Other compounds that will serve as dehydrating media are the acid halides of the organic acid analogues of the anhydrides mentioned above, and particularly the acid chlorides and acid bromides of the acids corresponding to the anhydrides.

Inorganic dehydrating agents, such as $PCl_3$, $POCl_3$, $PCl_5$, $PBr_3$, $POBr_3$, $PBr_5$ or $P_2O_5$ which on hydration form compounds which do not react with the monomers can also be employed to prepare the polymer. All these phosphorous compounds can be classed as inorganic acid anhydrides, since each will react with water to form one or more inorganic acids. Thionyl chloride can also be used but the $SO_2$ formed is a polymerization inhibitor and therefore must be removed from the reaction mixture if polymerization of the monomer is to be effected.

Concentrated sulfuric acid or fuming sulfuric acid can also be used as the dehydrating agent, but the polymer becomes slightly charred, as evidenced by a brownish discoloration. For this reason neither sulfuric acid nor fuming sulfuric acid is a preferred dehydrating agent.

In this specification the term dehydrating agent is intended to include the acid anhydrides described and acids having a very strong affinity for water, such as sulfuric and fuming sulfuric acids. The term acid anhydride is intended to include anhydrides of carboxylic acids, anhydrides of inorganic acids, mixed anhydrides of organic and inorganic acids of which acid halides are general examples and acetyl chloride a specific example and mixed anhydrides of inorganic acids such as the phosphorous halides and phosphorous oxyhalides which yield a halogen acid and phosphoric acid on hydrolysis and it also includes such mixed anhydrides as thionyl chloride.

In the reaction ½ molar equivalent of a dehydrating anhydride is needed to convert one mole of acrylic acid or its derivatives to the anhydride linkages. However, it is possible to convert only a portion of the acrylic acid or derivative to the anhydride form in the polymeric state. As little as ⅛ or ¼ molar equivalent of dehydrating anhydride or as many as two or three molar equivalents for each mole of acrylic acid or derivative can be used. I prefer to use about one to two molar equivalents of dehydrating anhydride for each mole of acrylic acid derivative thereof in preparing the anhydride form polymer. The dehydrating agent can be added in one lot or it can be proportioned as needed.

A cross-linked polymer containing linear recurring beta-methylene glutaric anhydride and substituted beta-methylene glutaric anhydride groups can be prepared by copolymerizing the alpha-beta-unsaturated monocarboxylic acid monomers as defined above with from about 0.01% to about 30% by weight of a cross-linking agent, based on the weight of the alpha-beta-unsaturated monocarboxylic acid monomers. The cross-linked polymers can be employed to make stable viscous mucilages in alkaline aqueous media.

The cross-linking agents may be defined as compounds having a plurality of terminal $CH_2=C<$ groups. They include polyunsaturated hydrocarbons such as divinyl cyclohexane; low molecular weight conjugated dienes, such as polybutadiene and other conjugated diene polymers having substantial unsaturation in the polymer molecule, sulfones, such as the polyallyl trimethyl trisulfones, particularly hexaallyl trimethylene trisulfone; unsaturated amides such as trimethacrylyl triazine and methylene-bis-acrylamide; di- and polyunsaturated esters, such as ethylene glycol diacrylate, allyl acrylate, allyl cinnamate, diallyl maleate, diallyl phthalate, diallyl malonate, diallyl succinate, etc.; polyunsaturated acids such as beta-styryl acrylic acid; polyunsaturated ethers such as divinyl ether, diallyl ether, diallyl ethylene glycol, 1,4,5,8-naphthalene tetrol ethers, the vinyl, allyl, methally and crotyl polyethers of polyalcohols containing 2 to 7 or more alkenyl ether groups per molecule; polyunsaturated ketones, such as divinyl ketone and diallyl ketone; polyunsaturated compounds containing one or more functional groups, such as the half ethers, allyl-beta-allyoxy propionate and allyl methacrylyl sucrose, the half ester monallyl maleate; the partial ethers of polyhydric alcohols, such as diallyl glycerol, polyallyl sucrose having 3 to 6 allyl groups per sucrose molecule, tri- and tetraallyl erythritol, tri- and tetraallyl pentaerythritol, tri-, tetra-, penta- and hexaallyl sorbitol or mannitol, polyallyl glucose, polyallyl levulose, polyallyl mannose, polyallyl gulose, polyallyl threose, polyallyl erythrose, polyallyl arabinose, polyallyl ribose, polyallyl xylose, polyallyl galactose, polyallyl lactose and other polyethers of mono-, di- and tri- and higher saccharides or oligosaccharides all of which contain at least three allyl groups per sugar molecule.

The method of preparing both the linear and cross-linked anhydride polymers from the monomers comprises polymerizing an alpha-beta-unsaturated monocarboxylic acid, and a comonomer if one is used, preferably in an inert solvent such as benzene, hexane, acetone, carbon tetrachloride, ethylene chloride or other known inert non-aqueous solvent in the presence of a free radical catalyst, such as benzoyl peroxide, caprylyl peroxide and azo-bis-isobutyronitrile, and also in the presence of a dehydrating agent, such as a carboxylic anhydride, an acid halide, such as an acid chloride or $P_2O_5$. The temperature of the reaction can be held at about 50° C. or below or it can be elevated to 70–100° C. However, I prefer to initiate the reaction at a temperature of 50–55° C. The reaction is fairly rapid and is complete within a few hours. The mechanism by which anhydride groups are formed on a linear polymer is not understood, since anhydride formation appears to proceed substantially simultaneously with polymer formation. When the polymerization reaction is carried out in a solvent for the monomers and a non-solvent for the polymers, the anhydride linkages are present on the polymer as it precipitates from the reaction mixture.

Anhydride groups can be formed on a carboxylic polymer in which adjacent carboxyl groups are separated by a maximum of three carbon atoms in the polymer chain by treating the polymer with any of the dehydrating agents mentioned above.

The anhydride polymers are substantially insoluble in hydrocarbon and halogenated hydrocarbon solvents.

The polymers of this invention can be extruded to form hydrocarbon resistant tubing. The anhydride polymers adhere strongly to aluminum, iron and brass. The anhydride films of the linear polymers can be fused onto the metals to provide solvent resistant coatings for benzene or hexane tanks. The cross-linked polymers do not dissolve in any known solvent, but the partial alkali metal salts form very viscous mucilages in aqueous media. The mucilages at concentrations of from 0.5 to 1% are excellent thickening agents for water systems and suspending agents for water-insoluble materials.

The following examples are intended to illustrate more fully the preparation of the linear anhydride according to the method of this invention but are not to be construed as a limitation on the scope thereof, for there are, of course, numerous possible variations and modifications of proportions and reaction conditions which will give operable results.

In the examples the parts are by weight unless otherwise specified.

EXAMPLE I

A mixture of about 90% of acetic anhydride and about 10% glacial acrylic acid, containing from about 1 to about 2% by weight of water and 98–99% acrylic acid, was prepared. To this mixture about 2% benzoyl peroxide based on the acrylic acid was added. The acrylic acid was then polymerized in a nitrogen atmosphere at a temperature of about 50° C. for 16 hours.

A white fluffy polymer precipitated and was separated from the liquid by filtration and dried in an oven at 50–60° C.

The polymer was readily soluble in dimethyl formamide, gamma-butyrolactone, nitromethane and N-methyl pyrrolidone. It also went into solution slowly in water and dilute aqueous NaOH. It is believed that the anhydride linkage of the polymer is slowly ruptured by water and aqueous alkali to form, respectively, partial acids and partial salts.

These solubility characteristics clearly indicate that the polymer formed was substantially linear.

The cation capacity of the polymer was 15.82 milliequivalents per gram, as compared to a theoretical value of 15.87 for polyacrylic anhydride and 13.8 for polyacrylic acid.

This polymer therefore consisted of a plurality of recurring

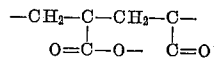

groups, with practically no free carboxyl groups.

EXAMPLE II

A mixture of 10% glacial acrylic acid, 90% benzene and 1 mole of acetic anhydride for each mole of acrylic acid was polymerized in an inert atmosphere in the presence of 2% benzoyl peroxide, based on acrylic acid. The polymerization temperature was 50° C. The polymer which was insoluble in the liquid reaction medium had the same solubility characteristics as those described under Example I.

EXAMPLE III

The proportions and conditions of Example II were used with the exception of the catalyst, which consisted of 2% of caprylyl peroxide.

The solubility characteristics of the polymer were extremely similar to those described for Example I, and the cation capacity was 15.45 meq./g.

EXAMPLE IV

Hexane was used as the reaction medium in place of benzene. The remaining ingredients, proportions and conditions were the same as those described for Example III. The polymer which resulted was soluble in the solvents listed under Example I and the cation capacity was 15.81 meq./g.

EXAMPLE V

Acetone was employed as the reaction medium diluent in place of hexane, but otherwise the ingredients, proportions and reaction conditions were similar to those of Example IV. The polymer which was formed had solubility characteristics of the polymer of Example I. The cation capacity was 15.07 meq./g.

EXAMPLES VI–X

In the following series of examples, polymerization of a 10% by weight solution of glacial acrylic acid in 90% by weight benzene was carried out in the presence of 2% azo-bis-isobutyronitrile catalyst (Porofor N). One mole of dehydrating agent was employed for each mole of acrylic acid.

Table I

| Dehydrating Agent | Polymerization Temperature, °C. | Solvents for Polymer |
| --- | --- | --- |
| Acetic anhydride | 70 | Aqueous NaOH, $H_2O$ dimethyl formamide, gamma butyrolactone, N-methyl pyrrolidone. |
| Tetrahydrophthalic anhydride | 70 | Do. |
| Acetyl chloride | 70 | Do. |
| Propionic anhydride | 70 | Do. |
| Phthalyl dichloride | 70 | Do. |

Each polymer was extracted with benzene to remove all the dehydrating agent and the acid that resulted from hydrolysis of the dehydrating agent. It is apparent from these data that the polymer in all instances is linear. The cation capacity of each polymer was well over 15.10 meq./g. showing that a very high proportion of the carboxyl groups were converted to anhydride linkages.

EXAMPLES XI–XIV

Polymethacrylic anhydride can be made by polymerizing glacial methacrylic acid in the presence of a dehydrating agent, in a manner very similar to that described for acrylic acid.

The proportions of methacrylic acid and diluent were 1 to 9. The molar ratio of dehydrating agent to glacial methacrylic acid was about 1 to 1.

The results of a series of tests using acetic anhydride as the dehydrating agent are listed in the following table.

Table II

| Ex. | Reaction Diluent | Catalyst | Temp., °C. | Solubility of Polymer |
|---|---|---|---|---|
| XI | Benzene | 2% benzoyl peroxide | 50 | Soluble in aqueous alkali H₂O, dimethyl formamide and gamma butyrolactone |
| XII | do | 2% Porofor N | 50 | Do. |
| XIII | Hexane | do | 50 | Do. |
| XIV | Acetone | do | 50 | Do. |

Each of these polymethacrylic anhydrides was slightly soluble in N-methyl pyrrolidone, but the solubility was lower than that of polyacrylic anhydride. At high concentrations the polymethacrylic anhydride was not truly soluble in N-methyl pyrrolidone, as evidenced by swelling and greatly increased viscosity.

The cation capacity of the polymers was at least 12.5 meq./g. or higher. The calculated value for polymethacrylic anhydride is 12.82 meq./g. and that of polymethacrylic acid is 11.6 meq./g.

The methacrylic acid used in the preparation of the polymer contained between 1 and 2% water.

EXAMPLES XV–XXII

A group of copolymers containing acrylic and substituted acrylic anhydride linkages were prepared in benzene with 1 mole of acetic anhydride per mole of monomer as the dehydrating medium. The glacial monomer-diluent mixture ratio was 1 to 9. In each instance the catalyst was azo-bis-isobutyronitrile at a concentration of 2% based on the monomers. The temperature of polymerization was 50° C. None of the monomers contained more than 5% water.

| Ex. | Monomers | Solubility |
|---|---|---|
| XV | 75% acrylic acid, 25% methacrylic acid. | Soluble in water and aqueous alkali. |
| XVI | 50% acrylic acid, 50% methacrylic acid. | Do. |
| XVII | 25% acrylic acid, 75% methacrylic acid. | Do. |
| XVIII | 75% acrylic acid, 25% acrylic anhydride. | Slight gel in gamma butyrolactone. |
| XIX | 50% acrylic acid, 25% methacrylic acid, 25% acrylic anhydride. | Do. |
| XX | 75% acrylic acid, 25% alpha-bromo acrylic acid. | Soluble in gamma butyrolactone. |
| XXI | 75% methacrylic acid, 25% alpha-bromo acrylic acid. | Do. |
| XXII | 25% acrylic acid, 75% methacrylic acid. | Do. |

The solubility characteristics indicate that the copolymers in which acrylic anhydride was employed as a monomer, cross-linking has occurred. The amount of cross-linking, however, is insufficient to prevent solubility of the polymers in aqueous alkaline media but is sufficient to produce a slight gel in gamma butyrolactone. Usually the mass copolymerization of such a high proportion of acrylic anhydride, with either acrylic acid or methacrylic acid in the absence of a dehydrating agent results in a hard, highly cross-linked infusible and completely insoluble polymer.

The cation capacities of all these polymers were very near the theoretical value. For example, that of Example XVI was 14.29 meq./g. and that of Example XVII was 13.59 meq./g.

EXAMPLE XXIII

Linear anhydride copolymers with other monounsaturated acids or anhydrides can also be prepared. A monomeric mixture of 75 parts glacial acrylic acid and 25 parts maleic anhydride was polymerized in an inert atmosphere in benzene at a temperature of 50° C. in the presence of one mole of acetic anhydride for each mole of acrylic acid and 2% azo-bis-isobutyronitrile. The resulting polymer was linear as indicated by its solubility in gamma butyrolactone, aqueous alkali, dimethyl formamide and N-methyl pyrrolidone. The cation capacity agreed very closely with the calculated values for a copolymer having the same ratio of anhydride groups in the polymer chain as that which should be present from the proportions of maleic anhydride and converted carboxyl groups of the monomeric mixture prior to polymerization.

EXAMPLE XXIV

Monomeric glacial acrylic acid and crotonic acid, which is a beta-methyl acrylic acid, were reacted to yield a linear, anhydride copolymer. The monomeric mixture contained 75% acrylic acid and 25% crotonic acid. The polymerization was effected in an inert atmosphere in benzene at a temperature of 50° C. in the presence of 2% azo-bis-isobutyronitrile. One mole of acetic anhydride was used as a dehydrating agent for each mole of acrylic acid.

The copolymer was soluble in water, aqueous alkali, dimethyl formamide and N-methyl pyrrolidone. The cation capacity of the copolymer was in good agreement with the calculated value, based on the monomeric mixture.

EXAMPLE XXV

A linear anhydride copolymer was prepared in an inert atmosphere from a monomeric mixture of 75% glacial acrylic acid and 25% sorbic acid. The reaction diluent, 90% by volume was benzene, the catalyst, azo-bis-isobutyronitrile, was employed in a 2% concentration, and the reaction temperature was about 50° C. The copolymer was soluble in the solvents mentioned in Example XXIV and its cation capacity showed that the carboxyl groups of both acidic monomers were converted substantially completely to anhydride linkages.

EXAMPLES XXVI–XXXVI

Anhydride polymers with controlled amounts of cross-linking to make the resulting copolymers either water-sensitive, i.e., swellable in water without true solution, or substantially water-insensitive and insoluble in ordinary solvents, can be made by copolymerizing acrylic acid, methacrylic acid or the other substituted monomeric derivatives of acrylic acid mentioned above, with a cross-link agent in the presence of a polymerization catalyst and an acid anhydride, which will not react with the polymerizable monomers, as a dehydrating agent.

A series of cross-linked polyacrylic anhydrides were made with varying amounts of cross-linking agents to yield polymers whose partial salts (75%) had properties varying from water-insensitivity to those which formed highly viscous mucilages at low concentrations in water.

Tabulated below are the characteristics of copolymers prepared by reacting acrylic acid and allyl sucrose containing an average of about 5.8 allyl groups per sucrose molecule. The polymerization was effected in benzene in the presence of 2% peroxide and one mole of acetic anhydride for each mole of acrylic acid.

| Ex. | Percent Allyl Sucrose in Monomer Mixture | Polymerization Temperature, °C. | Aqueous Mucilage Viscosity percent Polymer in Water | | |
|---|---|---|---|---|---|
| | | | 1.5 | 1.0 | 0.5 |
| XXVI | 0.25 | 50 | 47 | 20 | 2 |
| XXVII | 0.5 | 50 | 65 | 30 | 9 |
| XXVIII | 0.75 | 50 | 84 | 41 | 17 |
| XXIX | 1.0 | 50 | 105 | 48 | 22 |
| XXX | 1.5 | 50 | 174 | 93 | 26 |
| XXXI | 2.0 | 50 | 230 | 132 | 33 |
| XXXII | 2.5 | 50 | 238 | 84 | 14 |
| XXXIII | 3.0 | 50 | 110 | 32 | 5 |
| XXXIV | 5.0 | 50 | 80 | 23 | 2 |
| XXXV | 10.0 | 50 | | | |
| XXXVI | 1.0 | 70 | 98 | 52 | 21 |

The polymers which are cross-linked with 10% or more of allyl sucrose containing a plurality of allyl groups are not swellable in water, are insoluble in ordinary solvents, and are infusible. The can serve as ion exchange resins. The polymers containing 5% or less of the allyl sucrose cross-linking agent swell in water to form viscous mucilages which act as suspending and emulsion stabilizing agents.

EXAMPLE XXXVII

Another cross-linked, anhydride polymer was made by copolymerizing acrylic acid with 2% methylene-bis-acrylamide in benzene in the presence of a mole of acetic anhydride for each mole of acrylic acid. The reaction temperature was 50° C., and the catalyst was benzoyl peroxide in a concentration of 2%. The 75% neutralized polymer (using aqueous NaOH as the neutralizing medium) had a viscosity of 43, 10 and 2 in 1.5, 1.0 and 0.5% concentrations, respectively, in water.

EXAMPLES XXXVIII–XLIV

Other cross-linking agent can be used in preparing water sensitive polymers from acrylic acid. Tabulated below are the results obtained in preparing polymers with various cross-linking agents. The amount of cross-linking agent in each case was 2% by weight of the polymerizable comonomer or mixture of comonomers. The reaction was run at 50° C. in benzene as a diluent. Acetic anhydride in equimolar ratios with the acrylic acid was the dehydrating agent. Mucilages in water of the 75% sodium salt were prepared.

| Ex. | Monomer | Catalyst | Cross-Linking Agent | Viscosity of Mucilage | | |
|-----|---------|----------|--------------------|-----|------|------|
|     |         |          |                    | 1.5% | 1.0% | 0.5% |
| XXXVIII | Acrylic acid. | Caprylyl Peroxide. | Tetraallyl pentaerythritol. | 146 | 74 | 24 |
| XXXIX | ....do.... | ....do.... | Tetraallyl phloroglucinol | 306 | 172 | 46 |
| XL | 50% acrylic acid. 50% methacrylic acid. | Porofor N. | Divinyl benzene. | 3 | ---- | ---- |
| XLI | Acrylic acid. | ....do.... | Diallyl acrylamide. | 25 | 10 | 2 |
| XLII | ....do.... | ....do.... | Hexaallyltrimethylene trisulfone. | 138 | 45 | 9 |
| XLIII | ....do.... | ....do.... | Triallyl cyanurate. | 159 | 47 | 11 |
| XLIV | Methacrylic acid. | ....do.... | Divinyl benzene. | 1 | ---- | ---- |

It is apparent from these data that cross-linking agents with hydrophilic properties are more desirable for preparing copolymers where water-sensitive or water-swellable characteristics are desired. Divinyl benzene will react with acrylic or methacrylic acid, but the swelling characteristics of the resulting polymer in water are not great. In general also, cross-linked methacrylic acid and methacrylic anhydride polymers have lower swelling power in aqueous media than the acrylic acid polymers made by this method. It is to be understood that other monomers which will copolymerize with arcrylic acids as described heretofore can be used for preparing the cross-linked anhydride polymers.

EXAMPLE XLV

Certain inorganic dehydrating agents are also useful for preparing acrylic anhydride polymers. A mixture of 10% by weight of glacial acrylic acid, 2% caprylyl peroxide based on the acrylic acid and sufficient phosphorous pentoxide to convert all the acrylic acid to the anhydride form was made in benzene. The polymerization reaction was carried out at a temperature of approximately 50° C. The polymer was isolated as a fine, fluffy, white powder. A small amount of black residue which was not suspended in the benzene remained in the reaction vessel. The polymer had a cation capacity of 14.08 meq./g. The polymer was soluble in gamma-butyrolactone.

EXAMPLES XLVI–XLVIII

Glacial acrylic acid (1 part) was polymerized in benzene (9 parts) in the presence of an equivalent proportion based on acrylic acid, of $PCl_5$, $PCl_3$ and $POCl_3$, respectively, using 2% caprylyl peroxide as a polymerization catalyst. The eractions were run at 50° C. Each polymer settled to the bottom of the reaction flask as a very fine powder.

The anhydride polymer made with $PCl_5$ as the dehydrating agent contained about 4.9% acid chloride linkages, based on the chlorine analysis, and the cation capacity of the polymer was 16.31 meq./g. The polymer made with $POCl_3$ as the dehydrating agent had a cation capacity of 14.99 meq./g. and only very slight traces of chlorine could be detected in the polymer. All three anhydride containing polymers were soluble in gamma-butyrolactone.

EXAMPLE XLIX

To a solution of 1 part glacial acrylic acid in 9 parts benzene were added 2 parts of benzoyl peroxide and 2 molar equivalents of the anhydride of mono-chloro-acetic acid. The temperature of the mixture was adjusted to 50° C. Polymerization of the acrylic acid was completed in about 16 hours. The polymer settled as a fine white floc in the liquid diluent. Analysis of the polymer showed that it contained only a trace of chlorine and that it had a cation absorption capacity of 15.83 meq./g. showing that the polymer contained only a very small proportion of free carboxyl groups and well over 90% anhydride linkages. The polymer was soluble in gamma-butyrolactone and dimethyl formamide showing that it was linear.

EXAMPLE L

The procedure of Example XLIX was followed with glacial methacrylic acid in place of acrylic acid. The polymer contained traces of chlorine and had a cation absorption capacity of 13.1 meq./g.

These examples clearly indicate that the polymer which forms under the reaction conditions of this invention contain a plurality of methylene glutaric anhydride linkage along the main polymer chain.

Carboxyl groups of alpha-beta-unsaturated monocarboxylic acid polymers can be converted to anhydride groups by use of the same dehydrating agents as those employed in preparing polymeric anhydrides from monomeric alpha-beta-unsaturated monocarboxylic acids. In general the treatment of polymers of alpha-beta-unsaturated monocarboxylic acids requires a fairly long period of treatment with a dehydrating agent to get substantial conversion of the free carboxyl groups to anhydride linkages and attainment of 100% conversion to anhydride is possible only after protracted treatment with an acid anhydride.

EXAMPLE LI

Polyacrylic acid was prepared by polymerizing glacial acrylic acid in benzene as a diluent in the presence of 2% benzoyl peroxide at 50° C. A 10% slurry of the polymer in benzene was treated with one equivalent of thionyl chloride under reflux for 4 hours. The so treated polymer had a cation capacity of 14.71 meq./g. The chlorine content was 0.16%. These data show that the polymer contained 58% anhydride groups, a trace of (about 0.4%) acid chloride groups and 41.6% free carboxyl groups. The reacted polymer was soluble in gamma-butyrolactone and N-methyl pyrrolidone.

EXAMPLE LII

A 10% slurry of polyacrylic acid in benzene was reacted with two equivalents of acetic anhydride at 50° C. for 16 hours. The reacted polymer had a cation capacity of 14.28 meq./g. and was soluble in gamma-butyrolactone and N-methyl pyrrolidone.

EXAMPLE LIII

Polymethacrylic acid was prepared by the procedure described in Example LII. A 10% slurry in benzene was treated for 24 hours at 50° C. with two equivalents of acetic anhydride. The thus treated polymer had a cation capacity of 12.39 meq./g. indicating that 35% of the carboxyl groups were converted to anhydride linkages.

Polymers of other substituted acrylic acids as defined heretofore can be substituted for polymethacrylic acid to produce corresponding anhydride containing polymers. These include polyalpha-chloro-acrylic anhydride, polyalpha-bromo-acrylic anhydride, polyalpha-fluoro-acrylic anhydride, polyalpha-cyano-acrylic anhydride, polyethacrylic anhydride, polyalpha-phenyl-acrylic anhydride. Copolymers of acrylic or substituted acrylic acids with other alpha-beta-unsaturated monomers described above can also be given treatments such as those above to yield polymers having a plurality of alpha-methylene glutaric anhydride linkages along the main polymer chain.

In both the linear and cross-linked polymers and interpolymers the alpha-methylene glutaric anhydride linkages are spaced along the main polymer chain and are not part of the cross-linking structure. Cross-linking when desired can be very effectively controlled by the use of a polyunsaturated monomer of the type described above and copolymerizing it with the alpha-beta-unsaturated monocarboxylic monomer therewith under dehydrating conditions. The cross-linked structure which results has linear stability in that opening of the anhydride groups does not result in a decrease in molecular weight of the original cross-linked polymer.

The proportion of carboxyl groups converted to anhydride linkages on the main polymer chain can vary from about 10% to about 100% by controlling the conditions under which the anhydride groups are formed. Thus, if it is desired to make a polymer with from 10 to about 25% of the carboxyl groups converted to anhydride this can be effected quite readily by treating the polymer with an acid anhydride. To get substantially all of the carboxyl groups in anhydride form it is most simple to start with the monomers and carry out the polymerization in the presence of excess dehydrating agent. Use of less than the theoretical amount of dehydrating agent will usually result in a polymer having less than all of its carboxyl groups converted to anhydride linkages. By controlling the amount of dehydrating agent the proportion of carboxyl groups converted to anhydride can also be controlled with a fair degree of accuracy.

I claim:

1. A method for preparing polymers having a plurality of recurring alpha-methylene glutaric anhydride groups as part of the main chain thereof, comprising treating under substantially anhydrous conditions a member selected from the class consisting of (A) (1) at least one substantially anhydrous monomeric monocarboxylic acid having from 3 to 13 carbon atoms and a terminal $CH_2=$ group in a position beta to the carboxyl group as the sole aliphatic carbon-to-carbon unsaturation and containing only the elements carbon, hydrogen, oxygen and not more than 1 halogen in the alpha position, (2) mixtures of a major proportion of (1) with at least one other monoolefinic monomer which is copolymerizable with (1), (3) mixtures of (1) and .01 to 30% by weight based on said (1) of a polyunsaturated monomer which is copolymerizable with said (1), and (4) mixtures of (2) with .01 to 30% by weight based on said (2) of a polyunsaturated monomer which is copolymerizable with said (2), in the presence of a free radical catalyst and at a polymerizing temperature, and (B) polymers of said (A) at an elevated temperature, with (C) at least one mole of a dehydrating agent per molar equivalent of carboxyl in said (A) and (B), said dehydrating agent being selected from the class consisting of non-polymerizable carboxylic anhydrides of acids having at least 2 carbon atoms and up to about 18 carbon atoms, acid halides of said non-polymerizable acids, phosphorus halides, phosphorous oxyhalides, sulfur oxyhalides, wherein the halogen of said dehydrating agent has an atomic weight of from about 35.5 to about 80 and $P_2O_5$ said (B) being treated for a time sufficient to convert at least about 35% of the carboxyl groups to anhydride groups on the main polymer chain.

2. A method of preparing polymers having a plurality of recurring alpha-methylene glutaric anhydride groups as part of the main chain thereof comprising polymerizing under substantially anhydrous conditions in the presence of a free radical polymerization catalyst at a temperature between 0 to 100° C. at least one substantially anhydrous monomeric monocarboxylic acid having from 3 to 13 carbon atoms and a terminal $CH_2=$ group in a position alpha-beta to the carboxyl group as the sole aliphatic carbon-to-carbon unsaturation, with at least one mole for each mole of said monocarboxylic acid of a dehydrating agent selected from the class consisting of non-polymerizable carboxylic anhydrides of acid having at least 2 carbon atoms and up to about 18 carbon atoms, acid halides of said nonpolymerizable acids, $P_2O_5$, phosphorous halides, phosphorous oxyhalides and sulfur oxyhalides wherein the halogen of said dehydrating agent has an atomic weight of from about 35.5 to about 80.

3. A method of preparing a linear polymer having a plurality of anhydride linkages on the main polymer chain comprising polymerizing a substantially anhydrous monomer comprising acrylic acid in the presence of from about 1 to about 3 moles based on the acrylic acid of acetic anhydride.

4. The method steps of claim 3 in which the monomer comprises methacrylic acid.

5. The method steps of claim 3 in which the monomers comprise a mixture of acrylic and methacrylic acids.

6. The method steps of claim 3 in which the monomers comprise a mixture of acrylic acid and alpha-bromo acrylic acid.

7. The method steps of claim 3 in which the monomers comprise a mixture of methacrylic acid and alpha-bromo acrylic acid.

8. The method steps of claim 3 in which the monomers comprise a mixture of acrylic acid and maleic anhydride.

9. A method of preparing a polymer having a plurality of carboxylic anhydride linkages on the main polymer chain comprising treating polyacrylic acid with acetic anhydride for a time and at a temperature sufficient to convert at least 10% of the carboxyl groups of the polymer to anhydride groups.

10. The method steps of claim 9 in which the polymer is polymethacrylic acid.

11. The method steps of claim 9 in which the polymer is a copolymer of acrylic and methacrylic acids.

12. The method of claim 9 in which the dehydrating agent is phthalic anhydride.

13. The method of claim 11 in which the dehydrating agent is phthalic anhydride.

14. The method of claim 10 in which the dehydrating agent is $P_2O_5$.

15. The method of claim 11 in which the dehydrating agent is $P_2O_5$.

16. A method of preparing a cross-linked polymer containing a plurality of recurring alpha-methylene anhydride groups comprising polymerizing a substantially anhydrous monomeric mixture containing (1) a major proportion of at least one monocarboxylic acid having from 3 to 13 carbon atoms and a terminal $CH_2=$ group in a position alpha-beta to the carboxyl group as the sole aliphatic unsaturation and (2) from about 0.1 to about 30% by weight based on (1) of a polyunsaturated compound selected from the class consisting of polyallyl ethers of oligosaccharides, polyallyl trimethylene trisulfone, triacrylyl triazine, methylene bis-acrylamide, beta-styryl acrylic acid, divinyl ether, 1,4,5,8-naphthalene tetravinyl ether, divinyl ketone, diallyl ketone, and low molecular weight polymers of conjugated diene hydrocarbons having substantial unsaturation in the polymer molecule, said polymerization being effected in the presence of a free radical polymerization catalyst, and in the presence of at least one mole per molar equivalent of carboxyl in said monomeric mixture of a member selected from the class consisting of non-polymerizable carboxylic anhydrides of acids having at least 2 carbon atoms and up to 18 carbon atoms, acid halides of said non-polymerizable acids, $P_2O_5$, phosphorous halides, phosphorous oxyhalides, and sulfur oxyhalides wherein the halogen has an atomic weight of from about 35.5 to about 80.

17. The method of claim 16 in which the polymerizable acid is acrylic acid.

18. The method of claim 16 in which the polymerizable acid is methacrylic acid.

19. The method of claim 16 in which the dehydrating agent is acetic anhydride.

20. The method of claim 17 in which the dehydrating agent is acetic anhydride.

21. The method of claim 18 in which the dehydrating agent is acetic anhydride.

22. The method of claim 19 in which the cross-linking ingredient is polyallyl pentaerythritol.

23. The method of claim 20 in which the cross-linking ingredient is polyallyl sucrose having at least three allyl groups per sucrose molecule.

24. The method of claim 21 in which the cross-linking ingredient is polyallyl pentaerythritol.

25. The method of claim 21 in which the cross-linking ingredient is polyallyl sucrose having at least three allyl groups per sucrose molecule.

26. The method of claim 16 in which the cross-linking ingredient is methylene-bis-acrylamide and the dehydrating agent is acetic anhydride.

27. The method of claim 26 in which the polymerizable acid is acrylic acid.

28. The method of claim 26 in which the polymerizable acid is methacrylic acid.

29. A composition having a plurality of alpha-methylene glutaric anhydride groups selected from the class consisting of (1) linear homopolymers of a monocarboxylic acid having from 3 to 13 carbon atoms and a $CH_2=$ group in the position beta to the carboxyl group as the sole aliphatic unsaturation and having from about 35 to 100% of the carboxyl groups converted to said alpha-methylene glutaric anhydride groups, (2) linear interpolymers of a major proportion of the monocarboxylic acids defined in (1) and another monomer copolymerizable with the unsaturated acids in said (1) and having from about 35 to 100% of the carboxyl groups of said interpolymers converted to alpha-methylene glutaric anhydride groups, (3) cross-linked interpolymers of the acids in said (1) and from about .1 to about 30% by weight based on the unsaturated acids defined in said (1) of a polyunsaturated cross-linking agent other than a polyunsaturated anhydride of a carboxylic acid, said cross-linked interpolymer defined in (3) having from about 35 to about 100% of its carboxyl groups converted to alpha-methylene glutaric anhydride groups, and (4) cross-linked interpolymers of a major proportion of the monocarboxylic acids defined in (1) another monomer copolymerizable with the unsaturated acids in said (1) and from about 0.1 to about 30% by weight based on the weight of the combined weight of the copolymerizable acids and other monomer defined in (4) of a polyunsaturated cross-linking agent other than a polyunsaturated anhydride of a carboxylic acid, the said cross-linked interpolymer refined in (4) having from about 35 to about 100% of its carboxyl groups converted to alpha- methylene glutaric anhydride groups.

30. A linear anhydride of polyacrylic acid having from 35% to 100% of the carboxyl groups on the polymer converted to anhydride groups.

31. A linear anhydride of polymethacrylic acid having from 35% to 100% of the carboxyl groups on the polymer converted to anhydride groups.

32. A linear copolymer of acrylic and methacrylic acids having from 35% to 100% of the carboxyl groups converted to anhydride groups.

33. A linear copolymer of acrylic acid and an alpha-chloro acrylic acid having from 35% to 100% of the carboxyl groups converted to anhydride linkages.

34. A linear copolymer of acrylic acid and maleic anhydride having from 35% to 100% of the carboxyl groups of the acrylic acid moiety converted to anhydride groups.

35. A cross-linked interpolymer of acrylic acid and 0.1 to 30% by weight of polyallyl pentaerythritol in which from 35% to 100% of the carboxyl groups are converted to anhydride groups.

36. A cross-linked interpolymer of acrylic acid and 0.1 to 30% by weight of polyallyl sucrose having at least three allyl groups per sucrose molecule said polymer having from 35 to 100% of the carboxyl groups converted to anhydride groups.

37. A cross-linked interpolymer of acrylic acid and from 0.1 to 30% by weight of polyallyl phloroglucinol in which 35% to 100% of the carboxyl groups are converted to anhydride groups.

38. A cross-linked interpolymer of methacrylic acid and from 0.1 to 30% by weight of polyallyl pentaerythritol having from 35% to 100% of the carboxyl groups converted to anhydride groups.

39. A cross-linked interpolymer of methacrylic acid and from 0.1 to 30% by weight of polyallyl sucrose having at least 3 allyl groups per sucrose molecule, said interpolymer having from 35 to 100% of the carboxyl groups converted to anhydride groups.

40. A cross-linked interpolymer of methacrylic acid and from 0.1 to 30% by weight of polyallyl phloroglucinol, said interpolymer having from 35 to 100% of the carboxyl groups converted to anhydride linkages.

References Cited in the file of this patent

UNITED STATES PATENTS

| | | |
|---|---|---|
| 2,259,512 | Barnes | Oct. 21, 1941 |
| 2,308,581 | Barnes | Jan. 19, 1943 |
| 2,312,565 | McDowell et al. | Mar. 9, 1943 |
| 2,336,985 | Freund | Dec. 14, 1943 |
| 2,402,604 | Coffman | June 25, 1946 |
| 2,798,053 | Brown | July 2, 1957 |

FOREIGN PATENTS

| | | |
|---|---|---|
| 450,455 | Great Britain | July 15, 1936 |

UNITED STATES PATENT OFFICE
CERTIFICATE OF CORRECTION

Patent No. 3,137,660            June 16, 1964

John F. Jones

It is hereby certified that error appears in the above numbered patent requiring correction and that the said Letters Patent should read as corrected below.

Column 2, lines 16 to 21, the formula should appear as shown below instead of as in the patent:

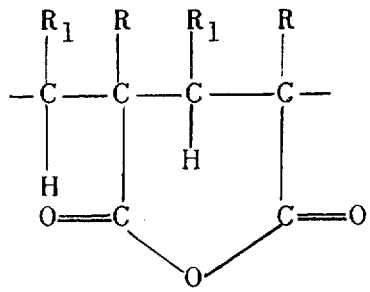

column 4, line 64, for "monallyl" read -- monoallyl --; column 9, line 19, for "agent" read -- agents --; column 14, line 7, for "refined" read -- defined --; same column 14, line 55, for "2,312,565" read -- 2,313,565 --.

Signed and sealed this 3rd day of November 1964.

(SEAL)
Attest:

ERNEST W. SWIDER            EDWARD J. BRENNER
Attesting Officer            Commissioner of Patents